United States Patent [19]

Bridgeford

[11] 3,872,196

[45] Mar. 18, 1975

[54] PROCESS FOR PLASTICIZING AND PARTIALLY DRYING TUBULAR FILM CASINGS FOR EDIBLE PRODUCTS

[75] Inventor: Douglas J. Bridgeford, Champaign, Ill.

[73] Assignee: Tee-Pak, Inc., Chicago, Ill.

[22] Filed: Dec. 4, 1972

[21] Appl. No.: 311,985

[52] U.S. Cl.................. 264/37, 264/185, 264/188, 264/202, 264/203, 264/209, 264/344
[51] Int. Cl............................................. B29c 25/00
[58] Field of Search ............ 264/203, 209, 37, 211, 264/344, 343, 202; 106/198; 260/29.6 B, 185, 188

[56] References Cited
UNITED STATES PATENTS

| | | | |
|---|---|---|---|
| 1,937,225 | 11/1933 | Hewitt | 264/209 |
| 2,273,636 | 2/1942 | Gellendien et al. | 264/343 |
| 2,399,970 | 5/1946 | Wilson | 264/203 |
| 2,460,400 | 2/1949 | Schlatter et al. | 264/203 |
| 2,917,397 | 12/1959 | Wilcox | 264/211 |
| 3,408,917 | 11/1968 | Cohly | 264/209 |

*Primary Examiner*—Donald J. Arnold
*Assistant Examiner*—Gene Auville
*Attorney, Agent, or Firm*—Neal J. Mosely; Russell L. Brewer

[57] ABSTRACT

An improvement in simultaneously plasticizing and drying tubular food casings of hydrophilic film comprises passing gel tubular film continuously through a hygroscopic solution containing a hygroscopic plasticizer at a rate sufficient to remove a predetermined amount of water therefrom without reaching equilibrium distribution of water and plasticizer between said gel film and said solution.

7 Claims, No Drawings

PROCESS FOR PLASTICIZING AND PARTIALLY DRYING TUBULAR FILM CASINGS FOR EDIBLE PRODUCTS

DESCRIPTION OF THE PRIOR ART

In the past, tubular food casings for edible products such as weiners, sausages, bolognas, and the like, have been made from regenerated cellulose, collagen, amylose, alginate, and sometimes polyvinyl alcohol through a combination of steps. These films generally were made from aqueous solutions of such polymers or polymer derivatives or precursors, cast into a film, formed into a tube, then inflated with air and passed through a dryer. These tubular films in the gel state generally contained a substantial proportion of water, e.g., about 65% by weight, for cellulosic films. To process the film so that it would have desirable characteristics, the tubular film was inflated with air and passed through a dryer. Drying conditions had to be carefully controlled so as to prevent baking of the outside of the tube which might prevent moisture from inside the tube passing through the walls of the tube for complete drying. To alleviate the possibility of baking or breaking of the film, drying was conducted at moderate temperatures with substantial air flow to permit passage of water vapor through the walls. One of the disadvantages of drying by this process was the high cost of the drying equipment of this primarily because of the magnitude of the equipment. Secondly, the instrumentation required to provide uniform drying without baking of the film was very expensive.

Prior to drying the tubular food casing, e.g., cellulose, the film was plasticized by passing the tubular casing through a glycerol-water solution containing about 14% glycerol. Usually, the period of exposure time was about 1-2 minutes in the bath. This conventional step of plasticization did not effect any substantial dehydration of the film since the plasticizer bath was relatively dilute and the residence time of the casing in the bath was insufficient to attain equilibrium distribution of glycerin and water.

It was also known to plasticize and partially dry cellulosic films by passing the film through a glycerin-water mixture containing about 14% glycerol and then passing this treated film through an acetone bath. The resulting acetone-water mixture referred to as the spent phase was distilled in order to recover the acetone. Some of the disadvantages with this process is that losses of acetone normally occurred due to processing and recovery and, therefore, costs of producing the film were increased. Additionally, two steps were involved in order to effect plasticization and drying.

SUMMARY OF THE INVENTION

A method has been found for simultaneously plasticizing and partially dehydrating a tubular food casing of a hydrophilic polymer which is formed continuously in a gel state. The improvement comprises passing the gel tubular film continuously through a hygroscopic solution containing a plasticizer for the gel film at a rate sufficient to remove a predetermined amount of water therefrom without reaching equilibrium distribution of water and plasticizer between the gel film and the solution. The hygroscopic solution containing a plasticizer for the gel film exchanges plasticizer for the water in the hydrophilic film. In this exchange, the water is extracted more rapidly than the plasticizer enters the film. Equilibrium distribution of the water and plasticizer takes several minutes. The improvement here involves sufficient passing of the film through the hygroscopic solution at a rate sufficient to remove a predetermined amount of water without allowing the hygroscopic agent or plasticizer to exceed undesirable levels in the film, i.e., in less than the time required to reach equilibrium.

DESCRIPTION OF THE PREFERRED EMBODIMENTS

In carrying out the process for making tubular food casings, a hydrophilic polymer is dispersed in water which can be extruded into a tubular film. The extruded film formed in the gel state and has a high water content. This film then is passed through a hygroscopic solution containing a plasticizer which effects simultaneous dehydration and plasticization. Often the dehydrating agent and plasticizing agent are one and the same.

The film should be passed and directed through the solution at a rate so that a substantial amount of water is removed from the film without substantial take-up of plasticizing agent. This direction of flow can be in counter-current or in the same direction in conventional columns, tubes, etc. When the concentration of water in the hygroscopic solution reaches an undesirable level because of absorption, the solution becomes spent and is sent to recovery.

Recovery of the spent solution, particularly the glycerin, is accomplished by removing the water. Water can be removed by distillation or by passing it through an acetone bath and then recovering the acetone by distillation. Once the hygroscopic solution is regenerated, it can be recycled for contact with additional gel film or recycled to make up new feed.

Hydrophilic polymers, as referred to herein, are polymer types used for tubular food casings that contain a high degree of absorbed water in the gel film. Typically, in the gel state, they contain from 40 to 90% or more water. Examples of hydrophilic polymeric films include cellulose, collagen, amylose, alginates, hydrolyzed polyvinyl acetate having a substantial hydroxyl content (less than 30% acetate) such as a polyvinyl acetate-polyvinyl alcohol or polyvinyl alcohol, the hydroxy alkyl celluloses such as hydroxymethyl cellulose, hydroxyethyl cellulose, and so forth, the carboxyalkyl celluloses such as carboxymethyl cellulose, cellulose acetate, cellulose butyrate, cellulose acetate proprionate, and the like. However, for reasons of efficiency and economy, the preferred hydrophilic polymers are regenerated cellulose from viscose, collagen and polyvinyl alcohol.

Hygroscopic solutions containing a plasticizer are solutions or dispersions containing an organic compound which is substantially water-soluble, that is, at least 50 parts organic compound will dissolve in 100 parts of water, and which contain a plasticizer for the hydrophilic gel film. High water solubility of the organic composition causes absorbed water to be extracted from the gel film. Plasticizer compositions capable of modifying the physical properties of the gel film so that it will possess desirable properties for tubular food casings are known in the art and they can be used here. Sometimes, one composition can perform both functions, that is, dehydrate and plasticize simultaneously. However, two compositions in the same hygroscopic solution can be used provided one does not interfere with the function of the other or adversely affect the physical properties of the resulting film. In preferred instances, however, it is preferred that both functions are performed by one organic composition.

Compositions which perform both hygroscopic and plasticizing functions in the gel film are the polyhydroxy compositions capable of forming hydrogen bonds with the hydrophilic film structure and effect an exchange of water from the film for the polyhydroxy composition. Generally, the polyhydroxy compositions are polyhydric alcohols having from about 2–12 carbon atoms in the structure and polymeric polyhydric alcohols having from 2–10 polyhydric alcohol units in the structure. By polyhydric, it is meant that these compositions have two hydroxyl groups or more in the structure but not necessarily a hydroxyl group on each carbon atom in the structure. However, they may have a hydroxyl group on each carbon atom. Also, the polyhydric alcohols can be substituted with other functional groups so long as they do not adversely interfere with the hygroscopic and plasticizing effects of the polyhydric alcohols. For example, the polyhydric alcohols may be substituted with an ether group, an epoxy linkage forming an anhydro composition, a ketone, an aldehyde, and so forth.

Examples of polyhydric alcohols and polymeric polyhydric alcohols include glycerol, polyglycerols having from 2 – 10 glycerol molecules in the structure and the fatty acid esters, e.g., triglycerol, decaglycerol, triglycerol monostearate, decaglycerol monostearate, glycols such as 1, 2, and 1, 3, propylene glycol, ethylene glycol, polyethylene glycols having from 2 – 10 ethylene glycol units in the structure, sorbitol, mannitol, arabitol, dulcitol, and the like. Further, the polyhydric alcohols can be sugars, preferably the $C_6$ and $C_{12}$ type, and they include glucose, sucrose, dextrose, corn syrup, (a source of glucose), lactose, fructose, levulose, and the like. Often a mixture of a member of the sugar class is admixed with glycerol or glycol to form the hygroscopic solution. Another class of organic compositions having hygroscopic effects as well as plasticizing effects on gel films include polyamine compositions. Typically, the polyamines are alkylene diamines and derivatives thereof, e.g., ethylene diamine, propylene diamine, ethylene diamine tetraacetic acid and alkali metal salts thereof such as sodium ethylene diamine tetraacetate, cupriethylene diamine, diethanolamine, triethanolamine, tetrakis hydroxypropyl amine, and the like. Generally, the polyamines are not preferred for practicing the invention because some of these have not been classified for approval for food use by the Food and Drug Administration. Secondly, they have not exhibited significant advantages over polyhydric alcohols, particularly glycerin in plasticizing and dehydrating the film.

For reasons of efficiency and economy and because of the desirable plasticizing properties imparted to the desirable hydrophilic films, e.g., cellulose, collagen and polyvinyl alcohol, glycerin is the preferred drying and plasticizing composition. It can also be one of the minor components in the hygroscopic and plasticizing composition and combined with other elements in the above class such as another polyhydric alcohol, e.g., sucrose or dextrose.

The concentration of hygroscopic and plasticizing agent for making the solution should be high, that is one containing from about 25–100% by weight of the solution of the hygroscopic and plasticizing component. Concentration of 100% can be used in practicing the invention, although this generally affords difficulty in controlling the period of contact time for removing a predetermined amount of the water from the hydrophilic film without interfering with the physical properties of the film by the exchange of plasticizing agent for water. The rate of exchange of plasticizing agent for the water in a hydrophilic film becomes extremely rapid up to a point as the concentration of plasticizing agent in the hygroscopic solution increases, particularly above about 70% by weight in the solution. When the proportion of hygroscopic component falls below about 25% by weight, the amount of water extracted from the hydrophilic film often is minor. Further, the operation is made difficult in that equilibrium conditions are approached in a short period of time. By that, it is meant that equilibrium is achieved typically in ½ to 1½ minutes. For reasons of efficient and overall control of dehydration and plasticization, the concentration of hygroscopic and plasticizing agent, preferably glycerol is from about 30 to 90% by weight.

Removing a predetermined major amount of water from the hydrophilic film means removing that amount of water desirable prior to submitting the tubular food casing to further drying to control in a dryer or windup onto a storage roll. Generally, the level of water in the film after drying is from about 5 to 30% for hydrophilic films. The predetermined amount of water may vary for each type of hydrophilic film for tubular food casings and to the type of casing produced. This water value may be from about 5 to 20% by weight for cellulose films whereas for collagen-type films this value may be from 10 to 25% by weight. Crosslinked polyvinyl alcohols and polyvinyl acetatepolyvinyl alcohols wherein the acetate functionality is not substantially more than about 15% by weight, should have a water content of 5 to 20%.

In removing the predetermined amount of water from the hydrophilic film, it is important that equilibrium distribution of water and plasticizer between the gel film and the solution not be reached. When equilibrium conditions for the concentrated plasticizer are reached, or even substantially approached as indicated by analysis, the plasticizer concentration of the plasticizer in the film often is too high. Generally, the amount of plasticizer in the film is expressed in terms of non-volatiles of the processed film or more particularly a percent of the total plasticizer and polymer in the film. In cellulose films, the percent of plasticizer based on the total plasticizer and cellulose in the film should not exceed about 35% by weight and preferably be about 25–30%.

The term equilibrium as used herein means the point where the concentration of plasticizer and hygroscopic component in the film is approximately that of the solution. The proportion of plasticizer in the film in equilibrium with the lowest amount of plasticizing composition to be used in forming the hygroscopic solution is undesirable because it tends to interfere with the physical properties of the film and causes the film to become tacky and sticky. This is particularly the case where cellulose or collagen films are the hydrophilic film and glycerol or a glycol, such as ethylene and propylene glycol, are the hygroscopic and plasticizing compositions. Where higher concentration of a hygroscopic and plasticizing agent are used in preparing the hygroscopic solution, e.g., above about 50%, equilibrium conditions certainly must be avoided. In fact, care must be exercised to keep the concentration of the plasticizing agent in film below about 50% of that in the solution.

Equilibrium is achieved in different periods of time depending on the hydrophilic film to be used, the temperature, hygroscopic, and plasticizing agent as used for making up the hygroscopic solution and agitation. For example, in studies by Wellish reported in the *Journal of Applied Polymer Science*, Vol. I, Issue 3, Pages 356–360 (1959) and Vol. II, Issue 5, Pages 236–240 (1959), and Vol. III, Issue 9, Pages 331–337 (1960), he determined that equilibrium for glycerol-water solutions containing about 10% glycerin were reached in about 25 seconds at 25°C. Whereas, more concentrated solutions such as containing at least 65% and up to 90% by weight glycerin in water had an equilibrium time of about 4–8 hours or, in fact, a day at the higher concentration. In the case of glycerin, regardless of the concentration of glycerin in solution, the concentration in the film should not exceed about 30%. Concentrations in the film higher than this value tend to produce tacky and sticky film, particularly with cellulose. However, the tolerable level varies with the polymer.

The temperature at which the hydrophilic gel film is passed through the hygroscopic solution for simultaneous removal of water while plasticizing the film can be conducted at about 25°–75°C. Higher temperatures may be used in some instances. However, the temperature limitations are dependent on the structural strength of the film and the rate at which one can control the removal of water from the film while controlling the amount of plasticizer exchange for the water in the film. Of course, higher temperatures generally make the processing a little more difficult to handle in that the rate of exchange of plasticizer or hygroscopic agent for water increases with increasing temperature and often becomes too high and results in producing a film having undesirable properties. For reasons of efficiency and economy, the preferred operating temperature of 25°–40°C is preferred.

An effective way to control the amount of plasticizer imparted to the film on contact is by measuring the difference in the concentration of the plasticizing hygroscopic composition in the gel film from that in the mixture and plotting that value against time. A graph of these values, i.e., the difference in concentration in the film from that in the solution, versus time will give an approximation for process control purposes so that one can determine the plasticizer concentration in the film after a given contacting time.

The passing of the gel film through the hygroscopic solution containing plasticizing agents can be done as an inflated tube or a flat film. Generally, it has been found that the tube in its flattened state is easier to manipulate.

The rate at which the gel film is passed through the hygroscopic solution, of course, is dependent upon the concentration of the hygroscopic agent and plasticizing composition in the solution. The period of time in which the predetermined major proportion of water is withdrawn from the hydrophilic film will be substantially less with a concentrated solution than that for a more dilute solution. The rate at which the gel film is passed through the hygroscopic solution must be such that the water content in the resulting film is from about 5–30% by weight. This level corresponds to a removal of from about 25–70% of the water initially in the film or about a 10–50% overall weight loss. For most films used as tubular casings, the period of time will be from about 10–75 seconds. In some instances, where appropriate hygroscopic solutions and plasticizing agents are used as manifested in the examples, the second drying step, i.e., that of inflating the tube or, if inflated, passing it through a heated dryer, can be eliminated. However, in most instances, a secondary drying step wherein the tube is then passed through a dryer in an inflated state is required for sizing as this usually gives better physical properties in the resulting film.

The following examples are provided to illustrate preferred embodiments to the invention and are not intended to restrict the scope thereof. All percentages are expressed as weight percentages, and all temperatures are in degrees Centigrade.

EXAMPLE I

A series of experiments were carried out, demonstrating the removal of water from gel cellulose when immersed in a plasticizing hygroscopic solution.

A first solution of 300 g of sucrose, 200 g of glycerol, and 300 g of water was formed by adding the respective components to a vessel and mixing. Then, a tubular gel cellulose film, regenerated from viscose, and consisting of about 70% water and 30% cellulose was immersed in the solution for about 15–20 seconds at a temperature of about 22°C in the solution. There was substantial removal of water from the gel cellulose as evidenced by a visible shrinkage of the film.

A second solution was prepared containing 300 g of sucrose, 200 g glycerol, and 500 g of water. A gel cellulose film was immersed in this solution to evaluate the removal of water. After a 15–20 second immersion, the film was withdrawn from the solution and passed through nip rolls. The film then was wiped with a towel and weighed. A 30% loss in weight occurred, accompanied by a slight shrinkage of the film.

Two additional experiments were carried out evaluating the effect of temperature on removal of the water from gel cellulose, when gel cellulose tubing (70% water : 30% cellulose) was immersed in a 300 : 200 : 300 sucrose : glycerol : water bath at 60°C. A 47% weight loss resulted.

When gel cellulose tubing was immersed in a 300 : 200 : 500 sucrose : glycerol : water bath, a 33% weight loss occurred after a 15 second immersion at 24°C and a 40% weight loss after a 15 second immersion at 60°C.

When the partial dehydration of gel cellulose is carried out on a continuous basis, the removal of water is accomplished as in the batch experiments above. Gel cellulose (70% water : 30% cellulose), regenerated from viscose extruded into conventional coagulating, regenerating, and wash baths, is passed continuously through a plasticizing hygroscopic bath (300 : 200 : 300 sucrose : glycerol : water) at room temperature and then dried continuously in a drier of conventional construction. The residence time of the gel casing in the plasticizing hygroscopic bath is 15–20 seconds.

The gel tubing has a 33% loss of weight on leaving the treating bath which results in an approximately 40% reduction in the load on the drier. Conventional driers for tubular gel casing may be reduced in length by up to 100 feet when 40% of the water is removed ahead of the drier as in the treating bath. For continuous operation, it is preferred to remove the treating bath on a continuous basis to a still where the excess water is distilled off and the solution returned to the bath.

EXAMPLE II

A series of experiments were carried out evaluating solutions of glycerol in water as a treating bath for partial dehydration and plasticization of gel cellulose films. The experiments were carried out at four different levels of glycerol concentration, two different temperatures, and a 15 second residence time in the treating bath. The results were the same for batch immersion and continuous immersion into and out of the treating bath as long as the residence time in the bath was the same. The procedures, both for batch and continuous treatment, were as in Example I.

Solutions of 99%, 75%, 50%, and 25% glycerol-water were prepared and used in treating baths for gel cellulose tubing. The temperatures of the baths were maintained at 25° and 60°C, respectively, and appropriate sections of gel cellulose casings were introduced into and removed from each bath as in Example I at each temperature. The weights of the gel cellulose casing before and after treatment were recorded and the glycerol content of the partially dehydrated gel cellulose was determined. Table I, below, gives the results of the experiments. In the table, there are two experiments at each temperature level for each level of glycerol content. The loss of weight, glycerol content, cellulose content, and glycerol percentage values are the average of the two experiments at a given temperature.

EXAMPLE III

A series of experiments were carried out in which gel collagen tubular casing was plasticized and partially dehydrated using glycerol-water treating baths. Gel collagen casing was prepared by conventional prior art techniques and the gel casing passed through the treating bath after washing but prior to drying. Tests were made in which the gel casings were immersed in various treating baths for various lengths of time and under various conditions. At a given set of process conditions the amount of water removed from and the amount of glycerol added to gel collagen is the same whether the treatment is batch or continuous. Gel casings were treated batch-wise by immersion and subsequent removal. They were treated continuously by continuous movement into and out of the bath with the casing having a predetermined residence time in the bath.

Gel collagen tubular casing having a diameter of about 0.8 inches and a wall thickness of about 10 mils was passed through 99 and 75% glycerol-water solutions for 20, 35, and 70 second periods. The gel collagen casing was weighed before and after immersion and the percent weight loss of water in the gel casing determined. The films were dried and the glycerol content measured in the collagen casing. These values are shown in Table II.

The results reported in Table II show that the 99 and 75% glycerol-water solutions are effective for partially dehydrating gel collagen casings when immersed for a period of time from 20–70 seconds. The glycerol concentration in the gel casing did not reach an excessively high level in the treated casing during these time periods.

TABLE I

| AQUEOUS DRYING GLYCEROL % GLYCEROL | BATH TEMPERATURE | DRYING PLASTICIZER-FREE GEL CELLULOSE CASING | | % LOSS (AVE.) OF INITIAL WT. | GLYCEROL IN DRIED FILM GM. | CELLULOSE IN DRIED FILM GM. | % GLYCEROL (CELL. + GLYC. BASIS) |
|---|---|---|---|---|---|---|---|
| | | INITIAL GEL FILM GM. | GEL FILM 15 SEC. IMMERSION GM. | | | | |
| 99 | 25°C | 7.00 / 6.95 | 4.22 / 4.24 | 39.6 | 0.3225 | 1.1180 | 22.4 |
| | 60°C | 7.10 / 7.15 | 3.70 / 3.80 | 47.4 | 0.7058 | 1.7432 | 28.8 |
| 75 | 25°C | 7.10 / 7.12 | 4.80 / 4.80 | 32.5 | 0.4817 | 1.7381 | 21.7 |
| | 60°C | 6.93 / 7.10 | 3.70 / 3.90 | 45.8 | 0.7431 | 1.8018 | 29.2 |
| 50 | 25°C | 6.70 / 6.75 | 4.90 / 5.10 | 25.7 | 0.4159 | 1.7290 | 19.4 |
| | 60°C | 6.85 / 6.93 | 4.55 / 4.50 | 34.3 | 0.6638 | 1.7415 | 27.6 |
| 25 | 25°C | 9.20 / 9.30 | 7.90 / 7.95 | 14.3 | 0.8612 | 2.3425 | 26.8 |
| | 60°C | 9.32 | 7.42 | 19.3 | 0.7525 | 2.405 | 23.8 |

TABLE II

DEHYDRATION OF COLLAGEN CASING

| | GLYCEROL-WATER GLYCEROL % | GEL COLLAGEN WEIGHT GM. | WT. AFTER IMMERSION | % WT. LOSS OF GEL | TIME IMMERSION SEC. | TEMP., °C. | GLYCEROL IN DRIED FILM GM. | COLLAGEN IN DRIED FILM GM. | % GLYCEROL (GLYC. + COLL.) |
|---|---|---|---|---|---|---|---|---|---|
| 1 | 99 | 22.7 | 18.6 | 18.1 | 35 | 25 | 0.4831 | 1.6081 | 23.0 |
| 2 | 99 | 21.7 | 15.0 | 28.1 | 70 | 25 | 0.7469 | 1.5726 | 30.8 |
| 3 | 99 | 19.4 | 14.9 | 23.2 | 35 | 25 | 0.3989 | 1.3855 | 22.3 |
| 4 | 75 | 18.15 | 15.3 | 15.7 | 35 | 25 | 0.3444 | 1.3306 | 50.2 |
| 5 | 75 | 13.3 | 11.1 | 15.7 | 35 | 25 | 0.9289 | 0.9683 | 50.0 |
| 6 | 75 | 21.15 | 13.2 | 37.6 | 35 | 60 | 0.4481 | 1.5996 | 22.0 |
| 7 | 99 | 19.5 | 9.8 | 49.7 | 35 | 70 | 0.4108 | 1.4420 | 22.0 |
| 8 | 99 | 27.5 | 13.4 | 51.3 | 35 | 70 | 0.5462 | 2.0376 | 21.1 |
| 9 | 99 | 21.6 | 12.0 | 44.4 | 20 | 70 | 0.6208 | 1.6683 | 27.1 |
| 10 | 99 | 28.5 | 15.1 | 50.0 | 20 | 70 | 0.7609 | 2.2229 | 23.9 |
| 11 | 99 | 28.4 | 13.0 | 54.2 | 20 | 90 | 1.6711 | 2.2594 | 42.8 |
| 12 | 99 | 28.5 | 13.1 | 54.1 | 20 | 90 | 1.7085 | 2.3013 | 45.1 |

EXAMPLE IV

A 10 g portion of gel polyvinyl alcohol film produced by hydrolysis of polyvinyl acetate contains about 80% by weight water. The 10 g sample of this film when dipped into an aqueous solution of sucrose and glycerol containing 30% glycerol, 20% sucrose, and 50% water for 35 seconds undergoes shrinkage and weight loss. The gel film has about a 40% loss of water by weight in the 35 second period of treatment. The film can be plasticized and partially dehydrated batch-wise or continuously.

EXAMPLE V

When a portion of gel cellulose film from viscose is immersed for a period of 30 seconds at room temperature in a 50% ethylene diamine-water solution, it undergoes shrinkage. The film may be immersed batch-wise or passed continuously through the treating bath for a predetermined residence time. The weight loss of the treated film shows a substantial extraction of water from the film. In the time period of treatment, very little ethylene diamine diffuses into the film and equilibrium conditions are not reached.

I claim:

1. In a process for producing tubular food casings of a hydrophilic polymeric film in which the tubular film is continuously formed in a gel state and dried the improvement for simultaneously drying and plasticizing said casing which comprises passing gel tubular film containing about 40–90% water continuously through a hygroscopic liquid consisting essentially of a hygroscopic and plasticizing agent for said gel film or an aqueous solution of a hygroscopic and plasticizing agent containing up to about 75% water at a rate sufficient to remove about 25–70% of the water therefrom without reaching equilibrium distribution of water and plasticizing agent between said gel film and said liquid and without allowing the plasticizing agent in said film to exceed about 30%.

2. The process of claim 1 wherein said hydrophilic polymer is selected from the group consisting of regenerated cellulose, cellulose ethers, cellulose esters, polyvinyl alcohol, polyvinyl ester-polyvinyl alcohol copolymers, alginate polymers, amylose, and collagen.

3. The process of claim 2 wherein said hygroscopic liquid containing a plasticizing agent is a polyhydric alcohol or polymeric polyhydric alcohol.

4. The process of claim 3 wherein said polyhydric or polymeric polyhydric alcohol is an admixture with water and the concentration of polyhydric alcohol is from 25 to 100%.

5. The process of claim 4 wherein said film is passed through said admixture of polyhydric alcohol and water for a time to reduce the water content in said film to about 5–30%.

6. The process of claim 4 wherein said polyhydric alcohol is selected from glycerol, ethylene glycol, propylene glycol, and sucrose or mixtures thereof.

7. The process of claim 4 wherein there is included the steps of regenerating the hygroscopic solution after the water concentration exceeds about 75% and then recycling the regenerated solution for contact with another portion of film.

* * * * *